United States Patent [19]

Barbarin et al.

[11] Patent Number: 4,461,716

[45] Date of Patent: Jul. 24, 1984

[54] USE OF FATTY AMINES TO IMPROVE THE PROPERTIES OF FOAMS AND IMPROVED FOAMING CONTAINING SAID AMINES

[75] Inventors: Michel Barbarin, Enghien-les-Bains; Ghislain Dufau, Bouffemont-Moisselles, both of France

[73] Assignee: Seppic, France

[21] Appl. No.: 81,195

[22] Filed: Oct. 2, 1979

[30] Foreign Application Priority Data

Oct. 17, 1978 [FR] France .................................. 78 29561

[51] Int. Cl.³ .................... B01J 13/00; B01F 17/02; B01F 17/10; B01F 17/16
[52] U.S. Cl. .......................................... 252/307; 47/2; 175/71; 252/3; 252/355; 252/356; 252/357; 252/DIG. 7; 252/DIG. 13; 261/DIG. 26; 501/84
[58] Field of Search ................... 252/307, 3, 357, 355, 252/356; 261/DIG. 26

[56] References Cited

U.S. PATENT DOCUMENTS

| | | | |
|---|---|---|---|
| 1,907,982 | 5/1933 | King | 252/307 |
| 2,196,042 | 4/1940 | Timpson | 252/3 |
| 2,322,789 | 6/1943 | Cole et al. | 209/166 |
| 2,971,458 | 2/1961 | Kumins et al. | 252/307 X |
| 3,664,965 | 5/1972 | Hirota et al. | 252/307 X |
| 3,959,160 | 5/1976 | Horsler et al. | 252/307 X |
| 3,970,620 | 7/1976 | Ihde, Jr. | 260/23 XA X |

*Primary Examiner*—Richard D. Lovering
*Attorney, Agent, or Firm*—Poms, Smith, Lande & Rose

[57] ABSTRACT

Use of fatty amines of general formula:

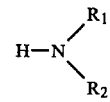

wherein $R_1$ may be a hydrogen atom, or a straight or branched alkyl radical, saturated and containing 4 to 18 atoms of carbon and wherein $R_2$ is a straight or branched alkyl radical, saturated and containing 4 to 18 atoms of carbon, together with surface agents, to obtain foaming mixtures leading to improved foams.

2 to 50% amines are added, with respect to the weight of the surface agents.

Application in the field of fire extinguishing foams, drilling, and in the production of lightweight products.

5 Claims, No Drawings

USE OF FATTY AMINES TO IMPROVE THE PROPERTIES OF FOAMS AND IMPROVED FOAMING CONTAINING SAID AMINES

The present invention relates to the use of certain additives for solutions of surface agents, to give to the foams prepared from these solutions stability, rigidity and unusual characteristics; such additives contain fatty amines.

It is known that surface agents, when in solution, have special properties, known as surface-active properties, one of which is their foaming power. The solutions of these products create foams readily when air is introduced into the medium, which foams are an assembly of gaseous cells separated by thin sheets of liquid, and are created by the juxtaposition of bubbles released by a gas dispersed in a liquid.

All surface agents have this property, whether they are anionic, non-ionic, cationic or ampholytic; the characteristics of these foams on the contrary vary depending on the products.

Now, the foaming properties of surface agents are useful in many applications, and amongst these can be classed non-restrictively:
the preparation of fire extinguishing foams,
the use of foams in the production of light-weight products such as: cements, plaster, ceramic, etc.
the use of foams as agents carrier of fragments of rocks during drilling operations,
the production of latex foams,
the use of foams as protective agents against spring frosts on trees and crops.

In all these applications, the mechanical properties of the foam have a great importance, and in particular its stability. It is a known fact that the mechanical characteristics of the foam are linked to the structure of the thin sheets of liquid constituting it: physical state, surface viscosity . . . .

It is known that certain substances can, when added to surface agents, very substantially change the structure of said thin sheets, thus affecting the stability of the foams. This is the case with most antifoams which destroy the arrangement of these thin sheets, causing the breakage of the foam.

It is also known that certain additives have a favorable effect on the structure of the said thin sheets such as fatty alcohols and fatty alkylolamides.

The addition of very small quantities of lauric alcohol to a solution of soda laurate increases the stability of the foams of said solution.

Fatty alkylolamides are commonly used in cosmetics and in detergents to improve the foaming power and the stability of shampoo foams, of foam baths, and of various detergents; said fatty alkylolamides are obtained by condensation of a fatty acid, of its methyl ester or of its glyceride, with an alkylolamine (a mono- or a diethanolamine or an isopropanolamine). The resulting amides are products whose properties and in particular that of solubility in water, vary with the fatty acid used, with the alkylolamine and especially with the relative proportions of both. The best results are obtained with amides of lauric acid added to alkylsulfates or to alkylethersulfates. The normal proportions vary between 25 and 30% of amide with respect to the anionic surface agent.

The tertiary amine oxides obtained by oxidising tertiary amines give results approaching those obtained with amides.

It is also known that the addition of soluble polymers, whilst increasing the viscosity of surface films, improves the mechanical properties of the foams obtained from the solutions of surface agents. Said polymers are of various origins, natural or synthetic: glues, gelatins, polysaccharides, bentonite, polyacrylic material, casein, cellulosic derivatives, proteins.

The present invention relates to the particularly favorable effect of certain fatty amines not only on the stability but also on the aspect and rigidity of the aqueous foams.

It was discovered, according to the invention, that when the aqueous foam of a surface agent of the anionic or amphoteric type is produced in the presence of a fatty amine, there is a substantial modification of the structure of the films and of the thin sheets forming the foam, as well as an improvement of the rigidity, of the stability and of the pasty power of the said foam.

The surface agent used to produce the foam is an anionic or amphoteric surface agent, that-is-to-say a surface agent with a number of anionic functions such as carboxylate, sulphate, sulphonate, or phosphate functions.

It was discovered, according to the invention, that the addition of fatty amines to aqueous solutions of surface agents completely modifies the structure of the surface films and of the thin sheets in the foams, thus giving the latter rigidity and stability, and increasing their viscous power, which is particularly advantageous for certain technical applications such as drilling, and porous structures for example.

The fatty amines related to in the present invention have the general formula:

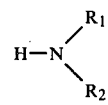

wherein $R_1$ may be a hydrogen atom, or a straight or branched alkyl radical, saturated, and comprising between 4 and 18 carbon atoms, and wherein $R_2$ is a straight or branched alkyl radical, saturated, and comprising between 4 and 18 carbon atoms.

The main ones amongst the commonly used amines object of the invention are stearylamines, cetylamines, myristylamines, laurylamines, decylamines, octylamines, 2-ethylhexylamines, or their mixtures, such as those resulting from the amination of total or fractionated fatty acids issued from coprah or palm oils.

It was found that when fatty amines are added to surface agents, in the proportion of 2 to 50% of their weight, the quality of the foams obtained from aqueous solutions of these surface agents is improved. The improvement is particularly obvious when using an amine with lauric chain, whether it be a laurylamine or amines obtained from fatty acids of the coprah.

The use of unsaturated fatty amines or of amine-ethers gives no advantageous results.

This improvement noted in the foaming properties when fatty amines are added is effective not only in the case of basic surface agents but also in more complex formulations comprising several surface agents or surface agents and polymers destined to improve the mechanical properties of the foams.

It does seem that, although this interpretation is in no way restrictive, there is a reaction between the surface agent comprising anionic functions and the fatty amine used.

The foams obtained according to the present invention show an improved half-life period, a better consistency and greater mechanical properties.

The half-life period is the period at the end of which the foam obtained from a certain volume of foaming solution has been drained from a quantity of solution corresponding to half the initial volume of the solution.

The consistency of the foam is expressed by a relative value obtained by measuring the rheological characteristics of the foam with a rotary disc viscometer.

Under these conditions, an aqueous solution at 0.2% of a surface agent normally used for this application, such as alkylsulphate or betaines, gives a consistency figure of the order of 1000 to 2000. The most consistent foams and the most "self-supporting" ones correspond to a value of between 5000 and 8000.

The increased stability of foams which is due to the addition of amine brings the half-life period from 5 to 6 minutes (in the case of basic surface agents) to durations that can reach several hours. Such an increased stability is noted both with hard city water and with distilled or purified water.

The improvement in the mechanical properties of the foams, which is due to the said addition of amines, occurs with distilled water as well as with city water or with waters containing strong quantities of electrolytes (150 g of NaCl per liter) or bivalent ions (35 g/l of $MgCl_2$, $6H_2O$ and 5 g/l of $CaCl_2$), such as can be found in drilling applications.

The foams improved according to the invention can be used in all the known applications of foams, and more particularly in the preparation of light-weight materials (fire clay) or in the drilling methods using foams.

The following examples illustrate the invention non-restrictively.

EXAMPLE 1

An alkylbetaine, prepared from a fatty chain issued from coprah oil, when placed in solution at 0.2% in a city water of hardness 37.6° (French hydrotimetry), gives a foam with the following characteristics:

| half-life period | 4 mins. 30 secs. |
|---|---|
| Consistency at 4 mins. 30 secs. | 1080 |

Said consistency of the foam corresponds to the foams normally formed from conventional solutions of surface agents, with no addition of any glues, gelatins, caseins or other thickening agents.

A solution at 0.2% of the mixture prepared with 75 parts of the said alkylbetaine and 25 parts of a primary fatty amine whose hydrophobic chain corresponds to that of total acids of coprah, gives in similar conditions, a foam of which
the half-life period has risen to 12 mins. and
the consistency at 12 mins. is 5320.

Said consistency corresponds to a very rigid and self-supporting foam.

EXAMPLE 2

An alkylamidobetaine prepared from a fatty chain issued from coprah oil, when placed in a solution at 0.2% in a city water of hardness 37.6° (French hydrometry), gives a foam with the following characteristics:

| half-life period | 6 mins. |
|---|---|
| consistency at 6 mins. | 1240 |

The mixture prepared with 87.5 parts of the said alkylamidobetaine and 12.5 parts of a primary fatty amine whose hydrophobic chain corresponds to that of total acids of coprah gives in similar conditions, a foam of which:
the half-life period has risen to 20 mins. and
the consistency at 20 mins. is 6640.

EXAMPLE 3

An alkylamidobetaine prepared from a fatty chain issued from coprah oil, when placed in solution at 0.2% in a city water of hardness 37.6° (French hydrotimetry), gives a foam with the following characteristics:

| half-life period | 6 mins. |
|---|---|
| consistency at 6 mins. | 1240 |

The mixture prepared with 87.5 parts of the said alkylamidobetaine and 12.5 parts of primary laurylamine gives in similar conditions:

| a half-life period of | 16 mins. |
|---|---|
| and a consistency at 16 mins. of | 4240. |

EXAMPLE 4

An ammonium alkylsulphate prepared from a natural lauric alcohol obtained by distillation of coprah alcohols, and containing approximately 70% of lauric alcohol and 30% of myristic alcohol, when placed in solution at 0.2% in a city water of hardness 37.6° (French hydrotimetry), gives a foam with the following characteristics:

| initial height: | 145 mm |
|---|---|
| initial consistency: | 2240 |
| half-life period: | 13 mins. |

The mixture prepared with 97.5 parts of the said ammonium alkylsulphate and 2.5 parts of primary fatty amine whose hydrophobic chain corresponds to that of total acids of coprah, gives in similar conditions, a foam of which:
the initial height has risen to 170 mm
the initial consistency to 3200
and the half-life period has become 17 mins.

The same ammonium alkylsulphate, when in solution at 0.2% in demineralized water, and depending on the quantities of coprah amine added thereto, gives the results contained in the following table:

| Ammonium alkylsulphate | 100 | 95 | 90 | 85 |
|---|---|---|---|---|
| Coprah amine | 0 | 5 | 10 | 15 |

|                          |       |       |       |       |
| ------------------------ | ----- | ----- | ----- | ----- |
| Initial consistency      | 3200  | 3360  | 3320  | 3680  |
| Half-life period         | 13 mins. 30 secs. | 21 mins. | 21 mins. | 24 mins. |
| Consistency at half-life period | 4400 | 4560 | 4400 | 5040 |

EXAMPLE 5

A mixtue prepared with 97.5 parts of the ammonium alkylsulphonate of Example 4 and 2.5 parts of stearylamine, gives foams with characteristics identical to those of Example 4.

EXAMPLE 6

A monoisopropanolamine alkylsulphate, prepared from synthetic alcohol in C12–C14, when placed in solution at 0.2% in a city water of hardness 37.6° (French hydrotimetry), gives a foam with the following characteristics:

| initial consistency | 2560 |
| ------------------- | ---- |
| half-life period    | 12 mins. |

The mixture prepared with 95 parts of the said monoisopropanolamine alkylsulphate and 5 parts of a primary fatty amine whose hydrophobic chain corresponds to that of total acids of coprah, gives in similar conditions, a foam of which:
 the initial consistency has risen to 3040
 and the half-life period to 19 mins.

The same monoisopropanolamine alkylsulphate, when placed in solution at 0.2% in a permuted water, and depending on increasing additions of the same fatty amines, gives the results contained in the following table:

| Monoisopropanolamine alkylsulphate | 100 | 95 | 90 | 85 |
| ---------------------------------- | --- | -- | -- | -- |
| Coprah amine                       | 0   | 5  | 10 | 15 |
| Initial consistency                | 2720 | 3360 | 3840 | 3600 |
| Half-life period                   | 7 mins. | 19 mins | 20 mins | 24 mins |
| Consistency at half-life period    | 3600 | 4640 | 5200 | 5040 |

EXAMPLE 7

A sodium alkylethersulphate prepared from a neutral lauric alcohol of mixture 70% C12 and 30% C14, condensed with 2 molecules of ethylene oxide, when placed in solution at 0.2% in a city water of hardness 37.6° (French hydrotimetry), gives a foam with the following characteristics:

| initial consistency           | 1400         |
| ----------------------------- | ------------ |
| half-life period              | 6 mins. 30 secs. |
| consistency at 6 mins. 30 secs. | 1200       |

The replacement of this alkylethersulphate with mixtures of said surface agent and increasing quantities of a primary fatty amine issued from total fatty acids of coprah, gives the results contained in the following table:

| Lauryethersulphate | 100 | 95 | 90 | 85 |
| ------------------ | --- | -- | -- | -- |
| Coprah amine       | 0   | 5  | 10 | 15 |
| Initial consistency | 1400 | 2160 | 2720 | 3600 |
| Half-life period | 6 mins 30 secs | 8 mins | 18 mins 30 secs | 24 mins |
| Consistency at half-life period | 1200 | 3600 | 5280 | 6000 |

EXAMPLE 8

A mixture prepared with 50 parts of the alkylaminobetaine described in Example 2 and 50 parts of a sodium alkylsulfosuccinamate, whose fatty chain is issued from coprah oil, when placed in solution at 0.2% with a city water of hardness 37.6° (French hydrotimetry), gives a foam with the following characteristics:

| initial height      | 150 mm   |
| ------------------- | -------- |
| half-life period    | 27 mins. |
| initial consistency | 2080     |

When replacing in the aforesaid mixture, 50 parts of the alkylsulfosuccinamate with 45 parts of the same substance and 5 parts of a primary fatty amine whose hydrophobic chain corresponds to that of total acids of coprah, the characteristics of the foam obtained in similar conditions reach the following values:

| initial height      | 140 mm         |
| ------------------- | -------------- |
| half-life period    | 2 hrs. 30 mins. |
| initial consistency | 4800           |

EXAMPLE 9

A mixture prepared with 75 parts of the alkylamidobetaine described in Example 2 and 25 parts of the sodium alkylsulfosuccinamate described in Example 7, when placed in solution at 0.2% in a city water of hardness 37.6° (French hydrotimetry), gives a foam with the following characteristics:

| initial height      | 140 mm   |
| ------------------- | -------- |
| half-life period    | 15 mins. |
| initial consistency | 2960     |

When replacing in the aforesaid mixture 75 parts of alkylamidobetaine with 66 parts of the same betaine and 9 parts of a primary fatty amine identical to that used in Example 7, the characteristics of the foam obtained in similar conditions become:

| initial height      | 140 mm  |
| ------------------- | ------- |
| half-life period    | 35 mins |
| initial consistency | >8000   |

An important fact to note is that it is possible, by changing the proportions of the three ingredients in the mixtures described in Examples 8 and 9, to obtain foams whose characteristics are controllable between the limits given in these examples, namely:
 half-life period: between 27 mins and 2 hrs 30 mins
 initial consistency: between 4800 and 8000 and this in order to adapt the quality of the foam to the proposed use.

EXAMPLE 10

For certain technical uses, it is required to have stable and self-supporting foams obtained from an alkylamidobetaine identical to that described in Example 2 with, in addition, 5% of its own weight of a homopolysaccharidic polymer known as Actigum CS6, such foams having:

a half-life period of 19 mins.

a consistency of 2320 (at the half-life period).

When replacing, in that formula, the alkylamidobetaine with a mixture of 87 parts of the said betaine and 13 parts of a total fatty amine of coprah, the resulting foams have:

a half-life period of 2 hours a consistency of 5600 (at the half-life period).

The present invention is concerned with:

the mixtures obtained from surface agents and fatty amines for the purpose of increasing the stability and the mechanical properties of their foams such as defined hereinabove, the addition of fatty amines to the solutions of fatty agents for the same purposes.

What is claimed is:

1. A method for improving the qualities of the foams obtained by foaming an aqueous solution of a surface agent of the anionic or amphoteric type, wherein the foaming is produced in the presence of 2 to 50% by weight, with respect to the weight of the said surface agent, of fatty amine of formula:

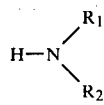

wherein $R_1$ is a hydrogen atom or a staight or branched alkyl radical, saturated, in $C_4$–$C_{18}$, and $R_2$ is a straight or branched alkyl radical, saturated, in $C_4$–$C_{18}$.

2. A method as claimed in claim 1, wherein the fatty amine is selected from the group consisting of stearylamines, cetylamines, myristylamines, laurylamines, decylamines, octylamines, 2-ethylhexylamines, and their mixtures.

3. A method as claimed in claim 2, wherein the fatty amine is selected from the group consisting of laurylamine and the fatty amines obtained from the fatty acids of coprah.

4. A method as claimed in claim 1, wherein the foaming is conducted in the presence of a polymer known to improve the mechanical properties of aqueous foams of surface agents.

5. Foaming agents permitting to obtain aqueous foams with improved properties, containing a surface agent of the anionic or amphoteric type and 2 to 50% by weight with respect to said surface agent of a fatty amine of formula:

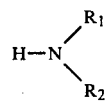

wherein $R_1$ is a hydrogen atom or a staight or branched alkyl radical, saturated, in $C_4$–$C_{18}$, and $R_2$ is a straight or branched alkyl radical, saturated, in $C_4$–$C_{18}$.

* * * * *